(12) United States Patent
Kim (10) Patent No.: US 11,845,398 B2
(45) Date of Patent: Dec. 19, 2023

(54) VEHICLE CONTROL METHOD AND VEHICLE CONTROL SYSTEM

(71) Applicants: Hyundai Motor Company, Seoul (KR); Kia Corporation, Seoul (KR)

(72) Inventor: Jaegwan Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/807,501

(22) Filed: Jun. 17, 2022

(65) Prior Publication Data

US 2023/0174019 A1    Jun. 8, 2023

(30) Foreign Application Priority Data

Dec. 2, 2021    (KR) .......................... 10-2021-0170642

(51) Int. Cl.
| | | |
|---|---|---|
| *B60R 25/25* | (2013.01) | |
| *B60K 28/06* | (2006.01) | |
| *B60R 25/01* | (2013.01) | |
| *B60R 25/30* | (2013.01) | |

(52) U.S. Cl.
CPC .............. *B60R 25/25* (2013.01); *B60K 28/06* (2013.01); *B60R 25/01* (2013.01); *B60R 25/305* (2013.01)

(58) Field of Classification Search
CPC ....... B60R 25/25; B60R 25/01; B60R 25/305; B60K 28/06
See application file for complete search history.

(56) References Cited

U.S. PATENT DOCUMENTS

| | | | | |
|---|---|---|---|---|
| 3,855,573 | A * | 12/1974 | Honda | B60K 28/063 340/576 |
| 2018/0074081 | A1 * | 3/2018 | Wakana | H04N 23/51 |
| 2019/0212732 | A1 * | 7/2019 | Takanashi | G05D 1/0027 |
| 2020/0219350 | A1 * | 7/2020 | Gester | B60W 40/08 |
| 2021/0101482 | A1 * | 4/2021 | Seo | B60K 28/063 |
| 2022/0147608 | A1 * | 5/2022 | Mochizuki | A61B 5/743 |
| 2022/0165089 | A1 * | 5/2022 | Mochizuki | G06V 10/96 |

FOREIGN PATENT DOCUMENTS

| | | | | |
|---|---|---|---|---|
| EP | 3529099 | A1 * | 8/2019 | ........... B60K 28/063 |
| KR | 20210041915 | A | 4/2021 | |
| KR | 102265624 | B1 | 6/2021 | |
| KR | 20210091452 | A | 7/2021 | |

\* cited by examiner

*Primary Examiner* — Thomas D Alunkal
(74) *Attorney, Agent, or Firm* — Slater Matsil, LLP (57) ABSTRACT

An embodiment vehicle control system includes a drinking measurement terminal provided in a vehicle, a user terminal including a photographing unit, and a server configured to determine whether to approve a key authority for the vehicle to a user based on a facial image of the user, in response to a key authority request for the vehicle and the facial image of the user being received from the user terminal, generate a door control signal for the vehicle based on whether the key authority for the user has been approved, determine whether the user meets driving suitability requirements based on a drinking measurement result provided by the drinking measurement terminal and the facial image of the user received from the user terminal, and generate a driving control signal based on whether the user meets the driving suitability requirements.

20 Claims, 6 Drawing Sheets

VEHICLE CONTROL METHOD AND VEHICLE CONTROL SYSTEM

CROSS-REFERENCE TO RELATED APPLICATIONS

This application claims the benefit of Korean Patent Application No. 10-2021-0170642, filed on Dec. 2, 2021, which application is hereby incorporated herein by reference.

TECHNICAL FIELD

The present disclosure relates to a vehicle control method and a vehicle control system.

BACKGROUND

A driver who operates a corporate taxi or bus may be registered as a user with a corporate taxi provider or bus provider. The corporate taxi provider or bus provider may manage shift workers of vehicle operation by using registered user information. The driver of the vehicle may take turns with another driver at a pre-designated garage.

However, since drivers who need to take turns often go directly and take turns at a predetermined garage, the commuting time of drivers may be excessively required. Therefore, there is a need for a method that can take turns with other drivers in places other than the garage.

The above information disclosed in this background section is only for enhancement of understanding of the background of the invention, and therefore it may contain information that does not form the prior art that is already known to a person of ordinary skill in the art.

SUMMARY

Embodiments of the present invention can solve the inconvenience of users to go directly to a predetermined place for vehicle access, and to reduce a time required for working a shift with other drivers.

An exemplary embodiment of the present invention provides a vehicle control system including a vehicle configured to provide a drinking measurement terminal and generate a drinking measurement result by the drinking measurement terminal of a user, and a service providing server configured to determine whether to approve a key authority for the vehicle to the user based on a facial image when a key authority request for the vehicle and the facial image of the user are received from the user terminal through an application, generate a door control signal for the vehicle based on whether the key authority for the user has been approved, determine whether the user meets driving suitability requirements based on the drinking measurement result and the facial image of the user received from the user terminal, and generate a driving control signal based on the result of determining whether the user meets the driving suitability requirements.

The service providing server may include a key authority approval unit configured to determine whether the user corresponds to a registered user based on the facial image when receiving the key authority request for the vehicle and the facial image of the user from the user terminal and approve the key authority for the vehicle when the user is the registered user, a door control unit configured to generate the door control signal for the vehicle based on the approval of the key authority for the user to transmit the generated door control signal to the user terminal, and a driving approval unit configured to determine whether the user meets the driving suitability requirements based on the drinking measurement result and the facial image and generate the driving control signal for the vehicle when the user meets the driving suitability requirements to transmit the generated driving control signal to the user terminal.

The service providing server may further include a database configured to store registered user information including biometric authentication information for the registered user.

The key authority approval unit may determine that the user is the registered user when the facial image is included in the registered user information and the location of the user terminal is in a region within a predetermined distance based on a specific region.

The door control unit may generate a door control signal for unlocking the door lock of the vehicle when the key authority for the user is approved and transmit the generated door control signal to the user terminal.

The user terminal may receive the door control signal and transmit the door control signal to the vehicle when the user terminal is connected with the vehicle through wireless communication.

The door control unit may generate a driving control signal for converting the vehicle to an undrivable state when the key authority of the user is approved and transmit the generated driving control signal to the user terminal.

The user terminal may receive the driving control signal and transmit the driving control signal to the vehicle when the user terminal is connected with the vehicle through wireless communication.

The driving approval unit may determine that the user meets the driving suitability requirements when a blood alcohol concentration of the user is less than a threshold alcohol concentration based on the drinking measurement result and the user is the registered user based on the facial image.

The driving approval unit may generate a driving control signal for converting the vehicle to a drivable state when it is determined that the user meets the driving suitability requirements and transmit the generated driving control signal to the user terminal.

The user terminal may transmit the driving control signal to the vehicle through wireless communication when receiving the driving control signal.

The driving approval unit may generate a driving control signal for converting the vehicle to an undrivable state when it is determined that the user does not meet the driving suitability requirements, transmit the generated driving control signal to the user terminal, and withdraw the key authority for the user.

The user terminal may transmit the driving control signal to the vehicle through wireless communication when receiving the driving control signal.

Another exemplary embodiment of the present invention provides a vehicle control method including steps of determining, by a service providing server, whether a user is a registered user from a photographing unit of a user terminal when receiving a key authority request for a vehicle from the user terminal, approving, by the service providing server, the key authority for the vehicle when the user is the registered user, generating, by the service providing server, a door control signal for the vehicle based on whether the key authority for the user has been approved, determining, by the service providing server, whether the user meets driving suitability requirements based on a drinking measurement result received from the vehicle and a facial image of the user received from the user terminal, and generating, by the service providing server, a driving control signal for the vehicle based on the result of determining whether the user meets the driving suitability requirements.

The generating of the door control signal for the vehicle may include generating, by the service providing server, a door control signal for unlocking the door lock of the vehicle when the key authority for the user is approved, and transmitting, by the service providing server, the generated door control signal to the user terminal.

The generating of the door control signal for the vehicle may further include generating, by the service providing server, a driving control signal for converting the vehicle to an undrivable state when the key authority for the user is approved, and transmitting, by the service providing server, the driving control signal to the user terminal.

The determining of whether the user meets the driving suitability requirements may include determining, by the service providing server, that the user meets the driving suitability requirements when a blood alcohol concentration of the user is less than a threshold alcohol concentration based on the drinking measurement result and the user is the registered user based on the facial image.

The generating of the driving control signal for the vehicle may include generating, by the service providing server, a driving control signal for converting the vehicle to a drivable state when it is determined that the user meets the driving suitability requirements, and transmitting, by the service providing server, the driving control signal to the user terminal.

The generating of the driving control signal for the vehicle may further include generating, by the service providing server, a driving control signal for converting the vehicle to an undrivable state when it is determined that the user does not meet the driving suitability requirements, and transmitting, by the service providing server, the driving control signal to the user terminal.

The generating of the driving control signal for the vehicle may further include withdrawing, by the service providing server, the key authority for the user when it is determined that the user does not meet the driving suitability requirements.

According to an embodiment of the present invention, since a user pre-registered as a driver of a vehicle may control the vehicle using a user terminal, it is possible to solve an inconvenience of having to directly go to a predetermined place when the user accesses the vehicle and reduces a time required for working a shift with other drivers. In addition, by strengthening the authentication requirements in an authentication process of the user, it is possible to operate a safer corporate taxi business and bus business.

The following elements may be referenced in connection with the figures in describing exemplary embodiments of the present invention.
1: Vehicle control system
10: Service providing server
110: Key authority approval unit
120: Door control unit
130: Driving approval unit
20: Vehicle
210: Drinking measurement unit
220: Electronic control unit (ECU)
30: User terminal
310: Application
320: Photographing unit
330: Bluetooth connection unit

DETAILED DESCRIPTION OF ILLUSTRATIVE EMBODIMENTS

Hereinafter, exemplary embodiments disclosed in this specification will be described in detail with reference to the accompanying drawings and the same or similar components are denoted by the same reference numerals regardless of a sign of the drawing, and duplicated description thereof will be omitted. Suffixes "module", "block", and "unit" for components used in the following description are given or mixed in consideration of easy preparation of the specification only and do not have their own distinguished meanings or roles. Further, in describing an exemplary embodiment disclosed in the present disclosure, a detailed description of related known technologies will be omitted if it is decided that the detailed description makes the gist of the exemplary embodiment of the present disclosure unclear. Also, it should be understood that the appended drawings are intended only to help understand embodiments disclosed in the present document and do not limit the technical principles and scope of the present invention; rather, it should be understood that the appended drawings include all of the modifications, equivalents or substitutes described by the technical principles and belonging to the technical scope of the present invention.

Terms including an ordinary number, such as first and second, are used for describing various constituent elements, but the constituent elements are not limited by the terms. The terms are used only to discriminate one constituent element from another component.

In the present application, it should be understood that the term "comprising" or "having" indicates that a feature, a number, a step, an operation, a component, a part or a combination thereof described in the specification is present, but does not exclude a possibility of presence or addition of one or more other features, numbers, steps, operations, components, parts or combinations thereof, in advance.

In a configuration of controlling other components in a specific control condition among the components according to an exemplary embodiment, a program implemented as a set of instructions embodying a control algorithm required for controlling other configurations may be installed. The control configuration may process input data and stored data according to an installed program to generate output data. The control configuration may include a non-volatile memory for storing programs and a memory for storing data.

Hereinafter, a vehicle control method and a vehicle control system of generating a door control signal for a door of the vehicle and generating a driving approval signal based on a facial recognition result and a drinking measurement result when the key authority of a user terminal for a vehicle is approved based on a facial recognition result and the user terminal approved with the key authority is connected to the vehicle through wireless communication will be described with reference to the drawings.

The wireless communication may be implemented through Bluetooth communication, Ultra-WideBand communication, or the like. Hereinafter, for convenience of description, it will be described that wireless communication is implemented through Bluetooth communication.

Figure 1:
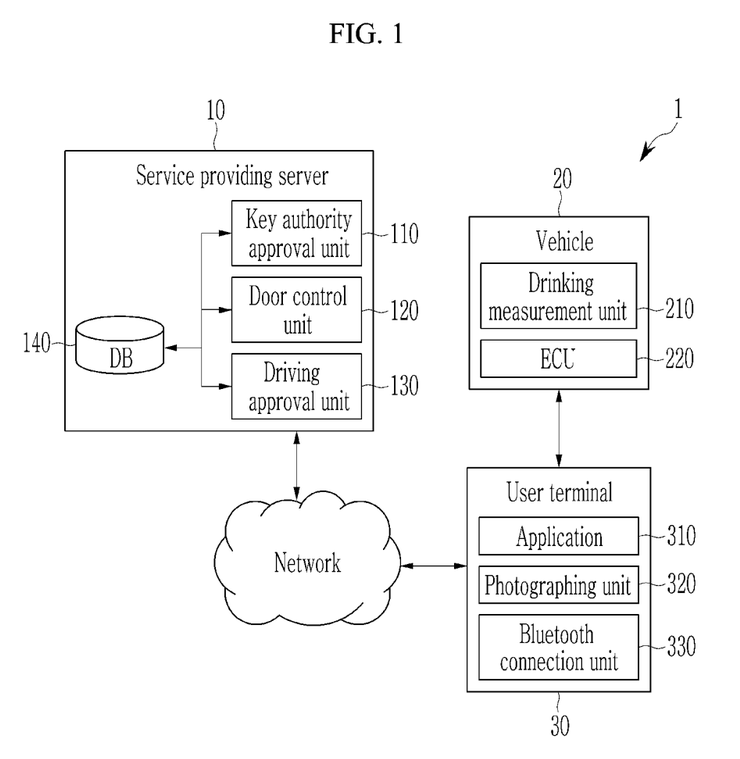
FIG. 1 is a block diagram schematically illustrating a configuration of a vehicle control system according to an exemplary embodiment.

FIG. 1 is a block diagram schematically illustrating a configuration of a vehicle control system according to an exemplary embodiment.

Referring to FIG. 1, a vehicle control system 1 includes a service providing server 10, a vehicle 20, and a user terminal 30. The service providing server 10 and the user terminal 30 are connected to each other via a network. The vehicle 20 may be connected to the user terminal 30 through Bluetooth communication. As is well known, the service providing server 10 may be implemented with a processor that can execute program code or instructions stored in an associated memory.

In FIG. 1, a signal generated from the configuration of the service providing server 10 and transmitted to the configuration of the user terminal 30 and a signal or request generated from the configuration of the user terminal 30 and transmitted to the configuration of the service providing server 10 may be transmitted/received via a network formed between the service providing server 10 and the user terminal 30.

The service providing server 10 may transmit to the user terminal 30 a control signal generated by determining whether to approve the key authority, whether to unlock the door, and whether to convert the vehicle 20 to a drivable state according to an authority request received from the user terminal 30. The drivable state may include a state in which an ignition (engine ignition) function of the vehicle 20 is activated through an application 310 of the user terminal 30. The service providing server 10 may include a key authority approval unit 110, a door control unit 120, and a driving approval unit 130. An operating subject of the service providing server 10 may be a provider to manage multiple drivers, such as a corporate taxi provider or a corporate bus provider. The authority request may include a request for authority to control the vehicle 20.

The service providing server 10 may include a memory configured to store a database 140 for a control authority of registered users and vehicles.

In the database 140, registered user information, user access records, state values for the user, door lock/unlock records of the vehicle 20, a location of the vehicle 20, drinking measurement values, state values of the vehicle 20, facial recognition result values, and the like may be stored. The registered user information may include biometric authentication information of a registered user, a facial image of a user registered as a driver capable of driving the vehicle 20, a schedule scheduled to operate the vehicle 20, and contents about a specific region. The specific region may be a region preset by the service providing server 10 to approve the authority of the vehicle 20 to the user of the user terminal 30. The state value for the user may have a different value according to each of the key authority approval and the key authority withdrawal for the user. That is, when the key authority for the user is approved and when the key authority for the user is withdrawn, the state value for the user may be different.

For example, the operating subject of the service providing server 10 sets a region other than the garage to a specific region, so that the user of the user terminal 30 is approved for the key authority for the vehicle 20 in the region other than the garage.

The service providing server 10 may change the state value for the user according to the approval or withdrawal of the key authority for the user of the user terminal 30 and store the changed state value for the user in the database 140. The service providing server 10 may store, in the database 140, a door lock/unlock record of the vehicle and a location of the vehicle 20 when the door lock/unlock state of the vehicle 20 is changed. When the service providing server 10 receives the drinking measurement result from the user terminal 30, the service providing server 10 may store the drinking measurement result in the database 140. When determining whether the facial image received from the user terminal 30 corresponds to the registered user, the service providing server 10 may store a facial recognition result value as the determined result in the database 140. The service providing server 10 may store a vehicle state value in the database 140 when the vehicle 20 is changed from the drivable state to an undrivable state or vice versa. The vehicle state value may have a different value depending on whether the vehicle 20 is in a drivable state.

The vehicle 20 may lock/unlock the vehicle 20 and turn on/off the drivable state according to the control signal received from the user terminal 30. The vehicle 20 may include a drinking measurement unit 210 and an electronic control unit (ECU) 220. The vehicle 20 may be a corporate taxi or bus. The vehicle 20 is a concept including various types of motilities such as a purpose built vehicle (PBV).

When the user inputs an authority request through the application 310, the user terminal 30 may transmit the authority request to the service providing server 10 to receive the authority for the door lock/unlock and the driving of the vehicle 20 from the service providing server 10 in response to the authority request. The user terminal 30 may transmit the authority received from the service providing server 10 to the vehicle 20 through Bluetooth communication. The user terminal 30 may include an application 310, a photographing unit 320, and a Bluetooth connection unit 330.

Hereinafter, each configuration according to a connection relationship of each configuration of the vehicle control system 1 will be described with reference to FIG. 2.

Figure 2:
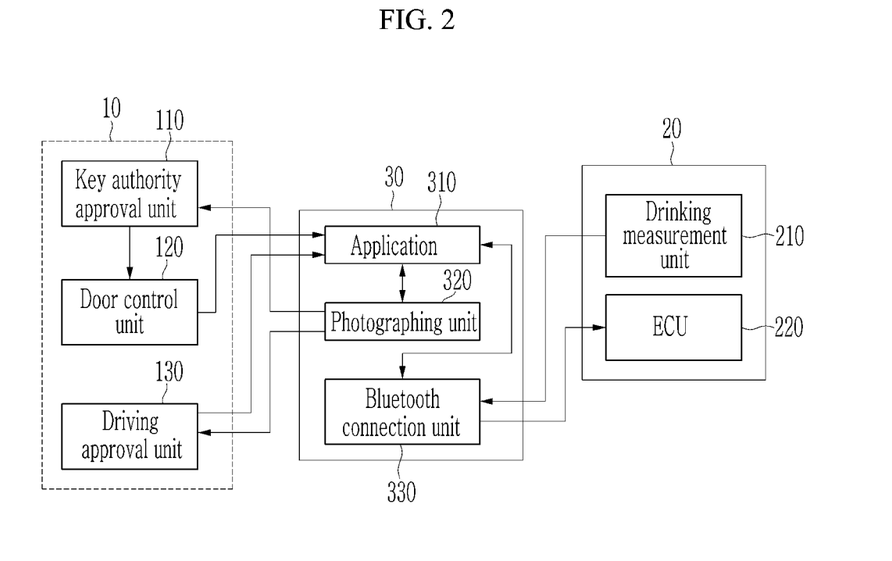
FIG. 2 is a diagram schematically illustrating a connection relationship among a service providing server, a vehicle, and a user terminal according to an exemplary embodiment.

FIG. 2 is a diagram schematically illustrating a connection relationship among a service providing server, a vehicle, and a user terminal according to an exemplary embodiment.

When the key authority approval unit 110 receives a key authority request signal through the application 310 of the user terminal 30, the key authority approval unit 110 may determine whether the user matches the registered user information based on the facial image received from the photographing unit 320 and approve or reject the key authority for controlling the vehicle 20 according to the determining result.

The database 140 may store registered user information including biometric authentication information of the registered user. The biometric authentication information may include information used for personal authentication or identification, such as a face, a fingerprint, an iris, and a hand vein of the user. The registered user information may include a facial image of a user registered as a driver capable of driving the vehicle 20 in the service providing server 10. For example, the registered user information may include a facial image of the user approved to drive the corporate taxi or bus. The registered user information may include a schedule in which the user is scheduled to drive the vehicle 20. For example, the registered user information may include a predetermined driver shift time for a shift of work in which the user uses the vehicle 20.

When the key authority is approved by the key authority approval unit 110, the door control unit 120 may generate a door control signal for unlocking the door lock of the vehicle 20 to transmit the generated door control signal to the user terminal 30. When the key authority for the user of the user terminal 30 is approved by the key authority approval unit 110, the door control unit 120 may generate a door control signal for unlocking the door lock and a driving control signal for converting the vehicle to an undrivable state to transmit the generated door control signal and driving control signal to the user terminal 30. When the user terminal 30 receiving the door control signal and the driving control signal are connected with the vehicle through Bluetooth, the user terminal 30 may transmit the door control signal and the driving control signal to the vehicle 20.

The driving approval unit 130 may determine whether the user of the user terminal 30 meets driving suitability requirements based on the drinking measurement result and the facial image received from the user terminal 30 and generate a driving control signal for controlling the drivable state of the vehicle 20 according to the determining result to transmit the generated driving control signal to the user terminal 30. For example, when a blood alcohol concentration of the user is equal to or greater than a threshold alcohol concentration and the facial image of the user corresponds to the registered user, it may be determined that the driving suitability requirements are met.

The drinking measurement unit 210 may be implemented in the form of a drinking measurement terminal located in the vehicle 20 to measure the drinking of the driver riding in the vehicle 20. The drinking measurement unit 210 may measure the drinking of the user to transmit the drinking measurement result to the user terminal 30. The vehicle 20 may be connected to the Bluetooth connection unit 330 through Bluetooth communication to communicate with the user terminal 30. The drinking measurement result may include whether or not the user drinks and/or the degree of drinking.

The ECU 220 may control the door lock/unlock of the vehicle 20 and control the drivable state of the vehicle 20. When the ECU 220 receives the door control signal from the user terminal 30, the ECU 220 may convert the door of the vehicle 20 from a locked state to an open state or vice versa based on the received door control signal or operate a door actuator mounted on the vehicle 20 to maintain the existing state. When the ECU 220 receives the driving control signal from the user terminal 30, the ECU 220 may convert the drivable state of the vehicle 20 from an on state to an off state or vice versa based on the received driving control signal or control an engine of the vehicle 20 to maintain the existing state.

The application 310 is installed in the user terminal 30. The application 310 may receive the authority request from the user to the user terminal 30 and may transmit the received authority request to the service providing server 10. The service providing server 10 may transmit a signal to the user terminal 30 through the application 310.

The photographing unit 320 may be implemented by a camera provided in the user terminal 30. The photographing unit 320 may photograph the facial image of the user and transmit the photographed facial image to the service providing server 10.

The Bluetooth connection unit 330 may connect the user terminal 30 and the vehicle 20 to each other through Bluetooth communication. The user terminal 30 may communicate with the drinking measurement unit 210 through Bluetooth communication.

Hereinafter, a vehicle control method of approving a key authority of a user terminal for a vehicle based on a facial recognition result, generating a door control signal for a door of the vehicle 20 when the user terminal approved with the key authority is connected to the vehicle through Bluetooth, and generating a driving control signal based on the facial recognition result and a drinking measurement result will be described with reference to FIGS. 3 to 5.

Figure 3:
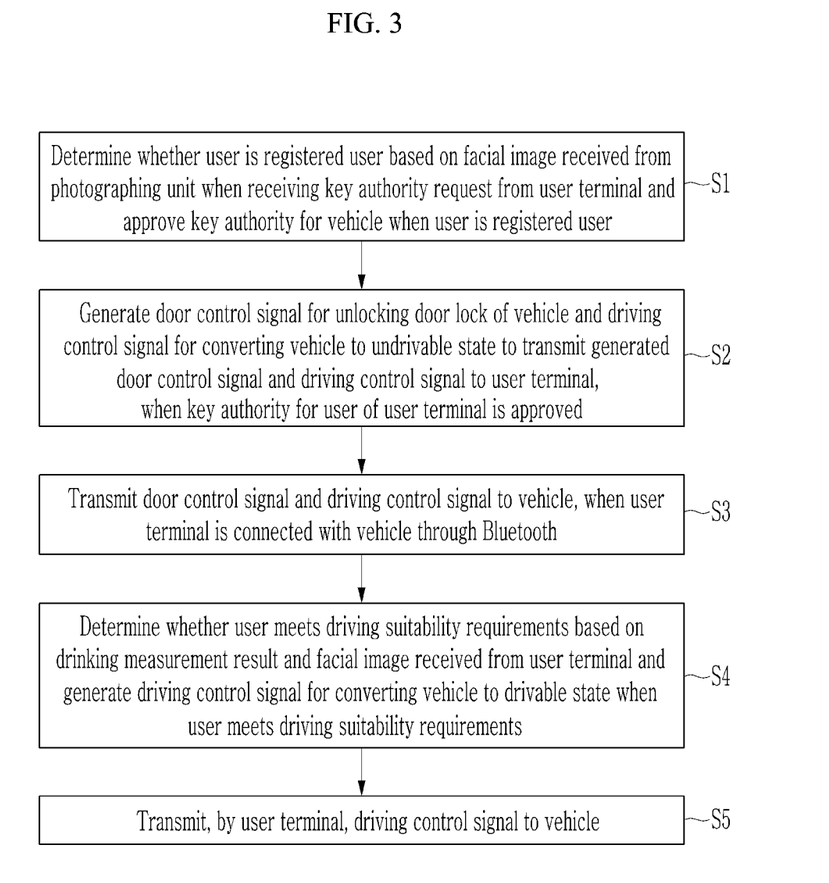
FIG. 3 is a flowchart of a vehicle control method according to an exemplary embodiment.

FIG. 3 is a flowchart of a vehicle control method according to an exemplary embodiment.

The user may transmit a key authority request for the vehicle 20 to the service providing server 10 through the application 310. When the key authority approval unit 110 receives a key authority request from the user terminal 30, the key authority approval unit 110 may determine whether the user corresponds to a registered user based on the facial image received from the photographing unit 320 and approve the key authority for the vehicle 20 when the user is the registered user (S1).

The key authority request may include a signal representing a location of the user terminal 30.

For example, when a company X is a corporate taxi company, if A and B are registered as drivers in the company X, when A driving a taxi inputs a key authority request to the user terminal 30 through the application 310 in order for B to work a shift with B, the key authority approval unit 110 may determine whether to approve the key authority of the taxi based on a facial image of B received from the photographing unit 320.

Figure 4:
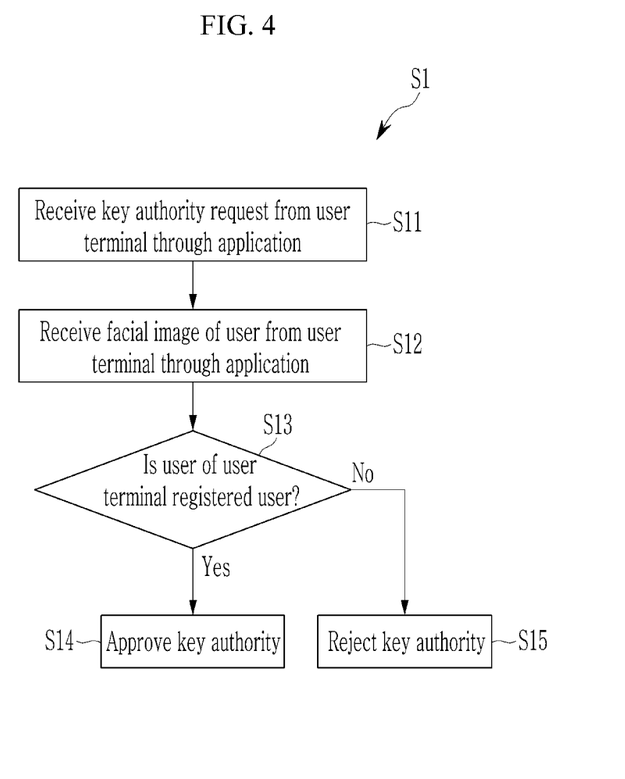
FIG. 4 is a detailed flowchart for describing step S1 of FIG. 3.

FIG. 4 is a detailed flowchart for describing step S1 of FIG. 3.

The key authority approval unit 110 may receive a key authority request from the user terminal 30 through the application 310 (S11). The key authority approval unit 110 may receive the facial image of the user from the photographing unit 320 through the application 310 (S12).

The photographing unit 320 may photograph the facial image of the user. The facial image of the user may be implemented by a 2D or 3D photograph including a certain ratio or more of facial image of the user. The photographing unit 320 may transmit the facial image generated by photographing the facial image of the user to the key authority approval unit 110.

The key authority approval unit 110 may determine whether the user of the user terminal 30 is a registered user based on the facial image received from the photographing unit 320, the location of the user terminal 30, and the location of the vehicle 20 (S13). The key authority approval unit 110 may apply a biometric authentication algorithm to determine whether the facial image is included in the registered user information. The key authority approval unit 110 may determine whether the location of the user terminal 30 and/or the location of the vehicle 20 are in a region within a predetermined distance based on a specific region.

In step S13, if the user of the user terminal 30 is the registered user, the key authority approval unit 110 may approve the key authority for the user (S14).

When the facial image received from the photographing unit 320 is included in the registered user information and the location of the vehicle 20 is in the region within a predetermined distance based on the specific region, the key authority approval unit 110 may determine that the user of the user terminal 30 is the registered user.

The key authority approval unit 110 may withdraw the key authority for a user (e.g., user A) other than the registered user while approving the key authority for the registered user (e.g., user B).

For example, the service providing server 10 may schedule the user A of another user terminal of which the key authority has been previously approved to work a shift for the operation of the vehicle 20 with a user B of the user terminal 30, based on a specific time in a region X. The specific time may be a time within the schedule in which the user B is scheduled to operate the vehicle 20 after the schedule in which the user A is scheduled to operate the vehicle 20 ends. In this case, the key authority approval unit 110 may approve the key authority for the user B, which is registered in the region X at the specific time, and withdraw the key authority for the user A.

When the key authority for the registered user is approved, the key authority approval unit 110 may store the state value for the registered user in the database 140 as a value according to the key authority approval. When the key authority for an unregistered user is withdrawn, the key authority approval unit 110 may store the state value for the unregistered user in the database 140 as a value according to the key authority withdrawal.

In step S13, when the user of the user terminal 30 is not the registered user, the key authority approval unit 110 may reject the approval of the key authority for the user (S15).

The key authority approval unit 110 may determine the approval or rejection of the key authority. The key authority approval unit 110 may grant the authority to access the door control unit 120 and the driving approval unit 130 through the application 310 of the user approved with the key authority. The key authority approval unit 110 may restrict or withdraw the access authority to the door control unit 120 and the driving approval unit 130 through the application 310 of the user whose key authority is not approved.

When the key authority for the user of the user terminal 30 is approved, the door control unit 120 may generate a door control signal for unlocking the door of the vehicle 20 and a driving control signal for converting the vehicle 20 to an undrivable state to transmit the generated door control signal and driving control signal to the user terminal 30 (S2). The user terminal 30 may transmit the door control signal and the driving control signal to the vehicle 20 when the user terminal 30 is connected with the vehicle 20 through Bluetooth (S3).

When the key authority for the user of the user terminal 30 is approved or rejected, the door control unit 120 may receive information on the key authority state from the key authority approval unit 110. The information on the key authority state may include information on whether the key authority of the user is in an approved state or a non-approved state. The non-approved state may include a state in which the approval is rejected, a state in which the approval is withdrawn after being approved, a state in which approval is not requested, and the like. When the key authority for the user of the user terminal 30 is approved, the door control unit 120 may generate a door control signal for unlocking the door lock of the vehicle 20. Alternatively, when the key authority for the user of the user terminal 30 is approved, the door control unit 120 may generate a door control signal for unlocking the door lock and a driving control signal for converting the vehicle to an undrivable state.

The user terminal 30 receives the door control signal and the driving control signal, and may transmit the door control signal and the driving control signal to the vehicle 20 when the user terminal 30 is connected with the vehicle 20 through Bluetooth. The user terminal 30 may transmit a signal to the vehicle 20 through Bluetooth.

When the ECU 220 receives the door control signal for unlocking the door lock, the ECU 220 may drive a door actuator mounted on the vehicle 20 so as to open the door of the vehicle 20. When the ECU 220 receives the driving control signal for converting the vehicle to the undrivable state, the ECU 220 may control an engine of the vehicle 20 so that the vehicle is undrivable.

The driving approval unit 130 may determine whether the user meets driving suitability requirements based on the drinking measurement result and the facial image received from the user terminal 30 and generate a driving control signal for converting the vehicle 20 to the drivable state when the user meets the driving suitability requirements according to the determining result to transmit the generated driving control signal to the user terminal 30 (S4). The user terminal 30 may transmit the driving control signal to the vehicle 20 (S5).

Figure 5:
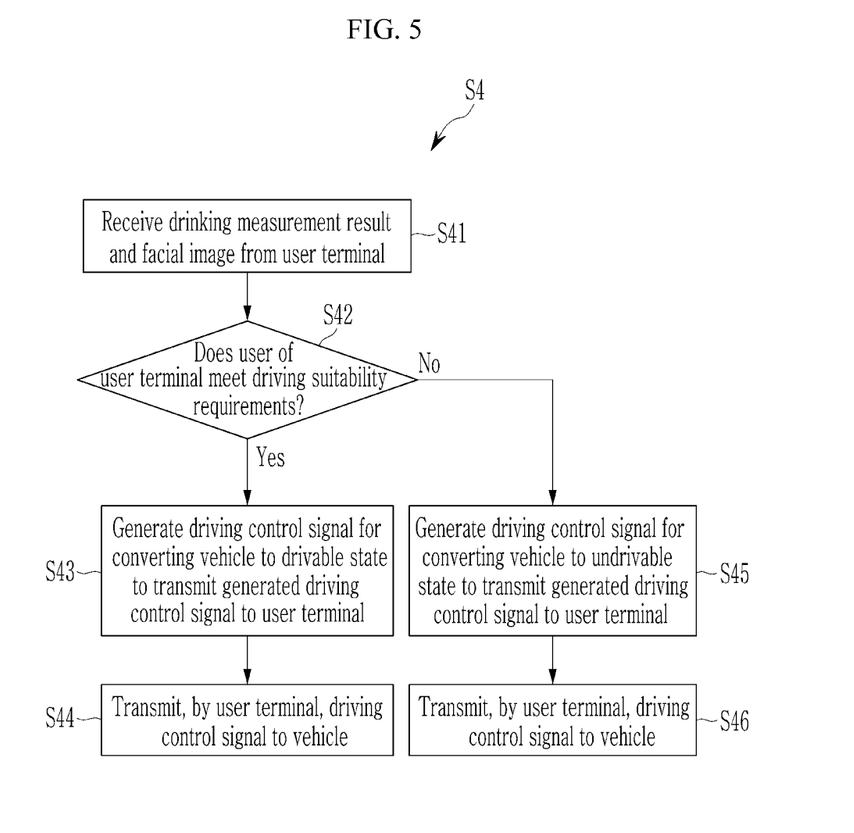
FIG. 5 is a detailed flowchart for describing step S4 of FIG. 3.

FIG. 5 is a detailed flowchart for describing step S4 of FIG. 3.

The driving approval unit 130 may receive the drinking measurement result and the facial image from the user terminal 30 (S41).

The drinking measurement unit 210 may measure the drinking of the user riding in the vehicle 20 to transmit the drinking measurement result to the user terminal 30. Here, the user may represent a user riding in the vehicle as the user of the user terminal 30. The drinking measurement result may be implemented in the form of a blood alcohol concentration of the user. The user terminal 30 may receive the drinking measurement result from the drinking measurement unit 210.

When the user terminal 30 receives the drinking measurement result from the drinking measurement unit 210, a trigger operates to photograph the facial image of the user by the photographing unit 320.

The user terminal 30 may transmit the received drinking measurement result and the generated facial image to the service providing server 10.

The driving approval unit 130 may determine whether the user of the user terminal 30 meets the driving suitability requirements based on the received drinking measurement result and the facial image of the user (S42).

The driving approval unit 130 may determine the drinking of the user of the user terminal 30 based on the drinking measurement result. For example, the driving approval unit 130 may determine that the user drinks when the blood alcohol concentration of the user is a threshold alcohol concentration or more. The driving approval unit 130 may determine whether the facial image corresponds to the registered user.

For example, the driving approval unit 130 may determine that the user meets the driving suitability requirements when the user does not drink and the facial image is the registered user.

In step S42, when it is determined that the user of the user terminal 30 meets the driving suitability requirements, the driving approval unit 130 may generate a driving control signal for converting the vehicle 20 to the drivable state to transmit the generated driving control signal to the user terminal 30 (S43).

After step S43, the user terminal 30 may transmit the driving control signal to the vehicle 20 (S44).

The user terminal 30 may transmit a signal to the vehicle 20 through Bluetooth. When the ECU 220 receives the driving control signal for converting the vehicle 20 to the drivable state, the ECU 220 may control an engine of the vehicle 20 to convert the vehicle 20 to the drivable state.

When the vehicle 20 is converted to the drivable state, the operation of the vehicle 20 may start.

In step S42, when it is determined that the user of the user terminal 30 does not meet the driving suitability requirements, the driving approval unit 130 may generate a driving control signal for converting the vehicle 20 to the undrivable state to transmit the generated driving control signal to the user terminal 30 (S45).

After step S45, the user terminal 30 may transmit the driving control signal to the vehicle 20 (S46).

The user terminal 30 may transmit a signal to the vehicle 20 through Bluetooth. When the ECU 220 receives the driving control signal for converting the vehicle 20 to the undrivable state, the ECU 220 may control an engine of the vehicle 20 to convert the vehicle to the undrivable state.

When it is determined that the user does not meet the driving suitability requirements, the driving approval unit 130 may withdraw the approved key authority of the user. The driving approval unit 130 may restrict or withdraw the authority for accessing the door control unit 120 and the driving approval unit 130 through the application 310 of the user of which the key authority is withdrawn.

Hereinafter, additional user authentication even after the driving approval unit 130 converts the vehicle 20 to the drivable state will be described with reference to FIG. 6.

Figure 6:
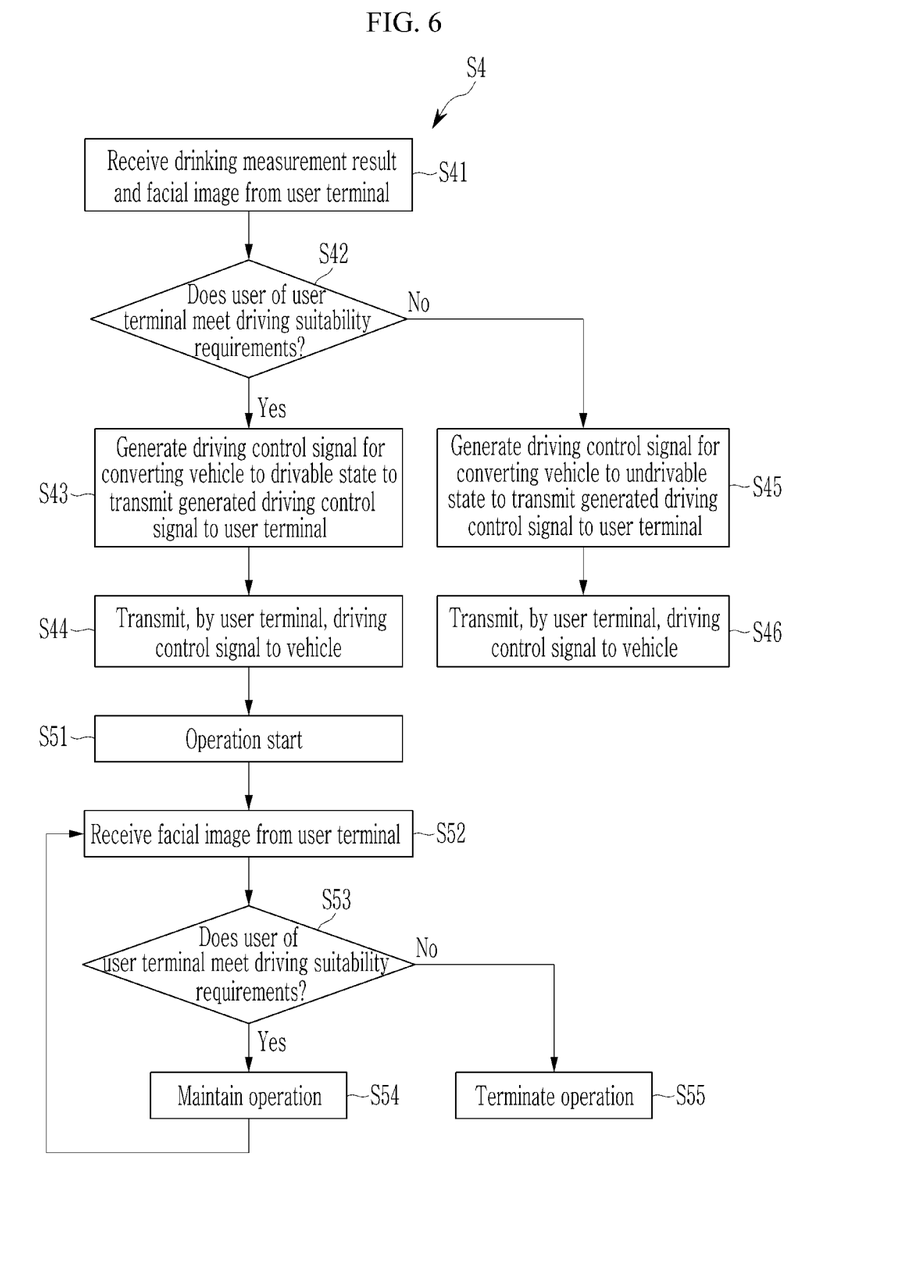
FIG. 6 is a detailed flowchart of step S4 of FIG. 5.

FIG. 6 is a detailed flowchart of step S4 of FIG. 5.

The description of steps S41 to S46 of FIG. 6 is the same as the description of steps S41 to S46 of FIG. 5.

After step S44, when the vehicle 20 is converted to the drivable state, the operation of the vehicle 20 may start (S51).

After step S51, the driving approval unit 130 may receive the facial image from the user terminal 30 according to a predetermined condition as initial information (S52). Here, the predetermined condition may include a predetermined period, a specific event condition, and the like. For example, when the door of the vehicle 20 is changed to an open state after the operation starts, the driving approval unit 130 may receive the facial image.

The photographing unit 320 may photograph the facial image of the user according to the user authentication request of the driving approval unit 130. The user terminal 30 may transmit the generated facial image to the service providing server 10.

The driving approval unit 130 may determine whether the user of the user terminal 30 meets the driving suitability requirements based on the facial image of the user (S53). The driving approval unit 130 may determine whether the facial image corresponds to the registered user. For example, when the facial image is the registered user, the driving approval unit 130 may determine that the user meets the driving suitability requirements.

In step S53, when it is determined that the user meets the driving suitability requirements, the driving approval unit 130 may maintain the operation of the vehicle 20 (S54).

Even after the driving approval unit 130 maintains the operation of the vehicle 20, step S52 may be performed again according to a predetermined condition.

In step S53, when it is determined that the user does not meet the driving suitability requirements, the driving approval unit 130 may terminate the operation of the vehicle 20 (S55).

In step S55, the driving approval unit 130 may generate a driving control signal for converting the vehicle 20 to the undrivable state to transmit the generated driving control signal to the user terminal 30. The user terminal 30 may transmit the driving control signal received from the driving approval unit 130 to the vehicle 20.

When the operation of the vehicle 20 is terminated, the service providing server 10 may store the door lock/unlock records of the vehicle 20 and the location of the vehicle 20 in the database 140.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A vehicle control system comprising:
   a drinking measurement terminal provided in a vehicle; and
   a server comprising a processor coupled to a memory storing program code, wherein the server is configured, when the processor is executing the program code, to:
   determine whether to approve a key authority for the vehicle to a user based on a facial image of the user provided, approval being determined in response to a key authority request for the vehicle and the facial image of the user being received from a user terminal through an application;
   generate a door control signal for the vehicle based on whether the key authority for the user has been approved;
   determine whether the user meets driving suitability requirements based on a drinking measurement result provided by the drinking measurement terminal and the facial image of the user received from the user terminal; and
   generate a driving control signal based on whether the user meets the driving suitability requirements.

2. The vehicle control system of claim 1, wherein the server is further configured to:
   determine whether the user corresponds to a registered user based on the facial image in response to receiving the key authority request for the vehicle and the facial image of the user from the user terminal and to approve the key authority for the vehicle when the user is determined to be the registered user;
   generate the door control signal for the vehicle based on the approval of the key authority for the user to transmit the generated door control signal to the user terminal; and
   determine whether the user meets the driving suitability requirements based on the drinking measurement result and the facial image and to generate the driving control signal for the vehicle when the user meets the driving suitability requirements to transmit the generated driving control signal to the user terminal.

3. The vehicle control system of claim 2, wherein the server further comprises a database configured to store registered user information including biometric authentication information for the registered user.

4. The vehicle control system of claim 3, wherein the server is configured to determine that the user is the registered user when the facial image is included in the registered user information and a location of the user terminal is in a region within a predetermined distance based on a specific region.

5. The vehicle control system of claim 2, wherein the server is configured to generate the door control signal for unlocking a door lock of the vehicle when the key authority for the user is approved and to transmit the generated door control signal to the user terminal.

6. The vehicle control system of claim 5, wherein the vehicle control system is configured so that the user terminal will receive the door control signal and transmit the door control signal to the vehicle when the user terminal is connected with the vehicle through wireless communication.

7. The vehicle control system of claim 5, wherein the server is configured to generate a driving control signal for converting the vehicle to an undrivable state when the key authority of the user is approved and to transmit the generated driving control signal to the user terminal.

8. The vehicle control system of claim 7, wherein the vehicle control system is configured so that the user terminal will receive the driving control signal and transmit the driving control signal to the vehicle when the user terminal is connected with the vehicle through wireless communication.

9. The vehicle control system of claim 2, wherein the server is configured to determine that the user meets the driving suitability requirements when a blood alcohol concentration of the user is less than a threshold alcohol concentration based on the drinking measurement result and the user is the registered user based on the facial image.

10. The vehicle control system of claim 2, wherein the server is configured to generate a driving control signal for converting the vehicle to a drivable state when it is determined that the user meets the driving suitability requirements and to transmit the generated driving control signal to the user terminal.

11. The vehicle control system of claim 10, wherein the vehicle control system is configured so that the user terminal will transmit the driving control signal to the vehicle through wireless communication when receiving the driving control signal.

12. The vehicle control system of claim 10, wherein the server is configured to generate a driving control signal for converting the vehicle to an undrivable state when it is determined that the user does not meet the driving suitability requirements, to transmit the generated driving control signal to the user terminal, and to withdraw the key authority for the user.

13. The vehicle control system of claim 12, wherein the vehicle control system is configured so that the user terminal will transmit the driving control signal to the vehicle through wireless communication when receiving the driving control signal.

14. A vehicle control method executed by a server comprising a processor coupled to a memory storing program code, the vehicle control method comprising:

determining whether a user is a registered user from a photographing unit of a user terminal in response to receiving a key authority request for a vehicle from the user terminal;
approving the key authority for the vehicle when the user is the registered user;
generating a door control signal for the vehicle based on whether the key authority for the user has been approved;
determining whether the user meets driving suitability requirements based on a drinking measurement result received from the vehicle and a facial image of the user received from the user terminal; and
generating a driving control signal for the vehicle based on whether the user meets the driving suitability requirements.

15. The vehicle control method of claim 14, wherein generating the door control signal for the vehicle comprises:
generating the door control signal for unlocking a door lock of the vehicle when the key authority for the user is approved; and
transmitting the generated door control signal to the user terminal.

16. The vehicle control method of claim 15, wherein generating the door control signal for the vehicle further comprises:
generating a driving control signal for converting the vehicle to an undrivable state when the key authority for the user is approved; and
transmitting the driving control signal to the user terminal.

17. The vehicle control method of claim 14, wherein determining whether the user meets the driving suitability requirements comprises determining that the user meets the driving suitability requirements when a blood alcohol concentration of the user is less than a threshold alcohol concentration based on the drinking measurement result and the user is the registered user based on the facial image.

18. The vehicle control method of claim 14, wherein generating the driving control signal for the vehicle comprises:
generating, a driving control signal for converting the vehicle to a drivable state when it is determined that the user meets the driving suitability requirements; and
transmitting the driving control signal to the user terminal.

19. The vehicle control method of claim 18, wherein generating the driving control signal for the vehicle further comprises:
generating a driving control signal for converting the vehicle to an undrivable state when it is determined that the user does not meet the driving suitability requirements; and
transmitting the driving control signal to the user terminal.

20. The vehicle control method of claim 19, wherein generating the driving control signal for the vehicle further comprises withdrawing the key authority for the user when it is determined that the user does not meet the driving suitability requirements.

* * * * *